(12) United States Patent
Chen et al.

(10) Patent No.: US 6,648,951 B2
(45) Date of Patent: *Nov. 18, 2003

(54) WATERFEST, ENVIRONMENTALLY FRIENDLY INKS ADAPTED FOR POINT-OF-SALE INK-JET APPLICATIONS

(75) Inventors: Xiaohe Chen, San Diego, CA (US); David Tyvoll, La Jolla, CA (US); George M. Sarkisian, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 162 days.

This patent is subject to a terminal disclaimer.

(21) Appl. No.: 09/946,460

(22) Filed: Sep. 4, 2001

(65) Prior Publication Data

US 2002/0078858 A1 Jun. 27, 2002

Related U.S. Application Data

(60) Provisional application No. 60/245,980, filed on Nov. 3, 2000.

(51) Int. Cl.[7] .............................................. C09D 11/02
(52) U.S. Cl. ............................... 106/31.47; 106/31.49; 106/31.51; 106/31.58
(58) Field of Search .................... 106/31.47, 31.58, 106/31.49, 31.51

(56) References Cited

U.S. PATENT DOCUMENTS

| | | | |
|---|---|---|---|
| 4,500,895 A | 2/1985 | Buck et al. ................... 347/87 |
| 4,509,062 A | 4/1985 | Low et al. .................... 347/87 |
| 4,685,968 A | 8/1987 | Palmer .................... 106/31.27 |
| 4,761,180 A | 8/1988 | Askeland et al. ......... 106/31.27 |
| 4,786,327 A | 11/1988 | Wenzel et al. ............ 106/31.27 |
| 4,809,428 A | 3/1989 | Aden et al. ................... 29/611 |
| 4,810,292 A | 3/1989 | Palmer et al. ........... 106/31.27 |
| 5,441,561 A | 8/1995 | Chujo et al. ............. 106/31.28 |
| 5,580,372 A | 12/1996 | Gino et al. .............. 106/31.59 |
| 5,788,754 A * | 8/1998 | Deardurff et al. ........ 106/31.58 |
| 5,851,273 A * | 12/1998 | Morris et al. ............ 106/31.27 |
| 5,882,390 A | 3/1999 | Nagai et al. ............. 106/31.49 |
| 5,925,176 A * | 7/1999 | Rehman ................... 106/31.43 |
| 6,379,441 B1 * | 4/2002 | Kanaya et al. ........... 106/31.49 |
| 6,436,179 B1 * | 8/2002 | Hiraoka et al. .......... 106/31.58 |
| 6,540,821 B2 * | 4/2003 | Adamic et al. .......... 106/31.48 |
| 2002/0112643 A1 * | 8/2002 | Tyvoll et al. ............. 106/31.47 |

FOREIGN PATENT DOCUMENTS

EP 0867486 A2 9/1998 ........... C09D/11/00

OTHER PUBLICATIONS

Hewlett–Packard Journal, pp. 4–37 (May 1985).
Hewlett–Packard Journal, pp. 6–56 (Aug. 1988).
Hewlett–Packard Journal, pp 51–98 (Oct. 1988).
Hewlett–Packard Journal, ppp 64–102 (Aug. 1992).
Hewlett–Packard Journal, pp. 6–97 (Feb. 1994).

* cited by examiner

Primary Examiner—Helene Klemanski

(57) ABSTRACT

A waterfast, environmentally friendly ink-jet ink, is disclosed comprising from 1% to 90% by weight of a first humectant selected from the group consisting of glycerol, propanediol, and combinations thereof; from 1% to 25% by weight of a second humectant selected from the group consisting of ethylene glycol, diethylene glycol, propylene glycol, and combinations thereof; from 1% to 20% by weight of a drying agent selected from the group consisting of 1,2-hexanediol, 1,2-pentanediol, and combinations thereof; from 0% to 20% by weight of 2-pyrrolidone; from 0.05% to 10.0% by weight of a waterfastness control dye selected from the group consisting of azo-containing dyes and phthalocyanine-containing dyes; and at least one additional dye present at from about 1.0% to 10.0% by weight. If the waterfastness control dye is an azo-containing dye, such dyes can include Direct Red 227, Direct Red 254, Direct Yellow 86, and Acid Orange 7. Alternatively, if the waterfastness control dye is a phthalocyanine-containing dye, the nickel, copper or aluminum phthalocyanines can be used.

23 Claims, No Drawings

WATERFEST, ENVIRONMENTALLY FRIENDLY INKS ADAPTED FOR POINT-OF-SALE INK-JET APPLICATIONS

Applicants claim priority to U.S. Provisional Patent Application Ser. No. 60/245,980 filed Nov. 3, 2000.

FIELD OF THE INVENTION

The present invention is drawn to ink-jet ink compositions that are environmentally friendly, reliable, fast drying, and waterfast for use in ink-jet printers, particularly thermal ink-jet printers used for point-of-sale (POS) applications.

BACKGROUND OF THE INVENTION

Thermal ink-jet printers provide an effective means of propelling ink-jet inks onto various media including paper. These printers accomplish this task by using resistive heater elements for heating the ink to a boil, and propelling the ink through an overlying orifice plate. Such printers are desirable for use for several reasons. For example, thermal ink-jet printers have a relatively fast throughput while being relatively inexpensive to run. Additionally, these printers are relatively easy to use, and the ink is easily replaced. Alternatively, piezo ink-jet printers can similarly be used effectively.

When formulating inks for use with point-of-sale (POS) applications, special challenges exist. Typical point-of-sale machines, including cash registers, credit card receipt printers, printers for checks, etc., print images that are often handled by clerks and customers immediately after printing. For example, after the printing of a receipt, a cash register worker must be able to grasp the receipt and hand it to the customer immediately. To accommodate immediate handling of such print jobs, some of the typical print technologies used for POS applications have included dot matrix impact printing and direct thermal printing. Though these technologies are functional, each has certain limitations. For example, dot matrix printing is often quite noisy, and direct thermal printing can require special paper and lacks permanence upon exposure to water, heat, or light. Additionally, neither technology currently provides the ability to efficiently print in multiple colors. Ink-jet printing would avoid these limitations, but in order to be effective, very fast drying inks must be used. In fact, due to the need to immediately handle printed papers as described previously, even inks that may otherwise be considered fast drying or waterfast may not be fast enough for POS applications.

There are several properties that one can consider when determining whether an ink is a good candidate for POS applications. Some of these include rapid printing capability, low toxicity, infrequent changing of ink cartridge, good decap, fast drying, at least equal in print quality to other technologies in the field, and adequate optical density. Of these properties, rapid printing capability, low toxicity, and fast drying properties are particularly important. Rapid print capabilities are accomplished by high frequency printing. For example, about 1.5 kHz can implemented, or even up to 3 kHz or greater can be effective for point-of-sale applications. With respect to low toxicity, ink compositions that are environmentally benign or have low toxicity are desired. This is because point-of-sale prints will likely be handled extensively, both by clerks and customers. Additionally, when discussing fast drying, what is meant is the ability of an ink to dry in a fraction of a second. In POS applications, the ink-jet ink should dry nearly instantaneously, since upon completion of printing a receipt, it will likely be immediately handled as described. Additionally, prior to handling, the receipt generally touches a tear bar on the printer above the print zone. Typically, this occurs approximately 300 msecs after printing a swath, and if the ink is not substantially dry, the tear bar can also smear the ink. Thus, to avoid smudges on the receipt and ink stains on the hands of the clerk or the customer, the receipt must be essentially dry prior to any opportunity for a person to handle the receipt, and preferably prior to the receipt touching the tear bar of the printing machine. With this in mind, it would be desirable to provide various ink-jet ink compositions that are environmentally friendly and can be used with POS apparatuses, taking in to account the challenges associated with POS applications.

SUMMARY OF THE INVENTION

A waterfast, environmentally friendly ink-jet ink, is disclosed comprising from 1% to 90% by weight of a first humectant selected from the group consisting of glycerol, propanediol, and combinations thereof; from 1% to 25% by weight of a second humectant selected from the group consisting of ethylene glycol, diethylene glycol, propylene glycol, and combinations thereof; from 1% to 20% by weight of a drying agent selected from the group consisting of 1,2-hexanediol, 1,2-pentanediol, and combinations thereof; from 0% to 20% by weight of 2-pyrrolidone; from 0.05% to 10.0% by weight of a waterfastness control dye selected from the group consisting of azo-containing dyes and phthalocyanine-containing dyes; and at least one additional dye present at from about 1.0% to 10.0% by weight. If the waterfastness control dye is an azo-containing dye, such dyes can include Direct Red 227, Direct Red 254, Direct Yellow 86, and Acid Orange 7. Alternatively, if the waterfastness control dye is a phthalocyanine-containing dye, then nickel, copper, and/or aluminum phthalocyanines can be used.

In one embodiment, the first humectant, the second humectant, and the 2-pyrrolidone of the above composition can be present such that a total weight percentage of these three components is from 30% to 90% by weight. In an alternative embodiment, when the total weight percentage of these three components, i.e., first humectant, second humectant, and 2-pyrrolidone, is greater than about 30%, only one dye is required to be present.

Additionally, a fast drying, environmentally friendly ink-jet ink composition for POS applications is disclosed having a dye load comprising from 0.05% to 1.0% by weight of a waterfastness control dye selected from the group consisting of azo-containing dyes and phthalocyanine-containing dyes; and at least one additional dye present at from about 1.0% to 10.0% by weight, with the proviso that the total dye load be at least 2% by weight, and wherein the ink-jet ink is substantially non-toxic.

A point-of-sale printing system is also disclosed, comprising a non-toxic ink-jet ink; a point-of-sale (POS) paper configured for accepting printed ink-jet ink; and an ink-jet pen configured for rapid printing of the ink-jet ink onto the paper, wherein the ink-jet ink printed on the paper has a drytime of less than 300 msec, and wherein the ink-jet ink exhibits good long-term decap performance, i.e., on the order of multiple weeks.

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

The singular forms "a," "an," and, "the" include plural referents unless the context clearly dictates otherwise. Thus, for example, reference to "an ink" includes reference to one or more of such inks.

As used herein, "effective amount" refers to the minimal amount of a substance or agent, which is sufficient to achieve a desire effect. For example, an effective amount of an "ink vehicle" is the minimum amount required in order to create ink, which will meet functional performance and characteristic standards set forth herein.

As used herein, "ink vehicle," refers to the vehicle in which dyes are placed to form an ink. Ink vehicles are well known in the art, and a wide variety of ink vehicles may be used with the ink composition of the present invention. Such ink vehicles may include a mixture of a variety of different agents, including without limitation, surfactants, solvents, co-solvents, buffers, biocides, viscosity modifiers, surface-active agents, and water. However, no substance can be added to an ink-jet ink of the present invention that would cause the ink-jet ink to become toxic.

"Waterfastness control dye" shall include any azo-containing dye or phthalocyanine-containing dye which is functional to improve waterfastness of an ink-jet ink composition. The dye used as the waterfastness control dye cannot act as the second dye.

"Second dye" or "additional dye" can be any dye, regardless of chemical structure, that is functional for imparting desired coloration properties, as well as for imparting ultra-violet and infrared absorbing properties. Even azo-containing dyes and phthalocyanine-containing dyes that are functional also as the waterfastness control dye can be used as the second dye, as long as it is a different dye than that dye used for waterfastness control. "Second dye" and "additional dye" also can include not only a single dye, but a combination of two or more dyes.

"Environmentally friendly" or "non-toxic" shall mean any ink-jet ink composition that can be ingested in small amounts and can be discarded in wastewater streams without producing adverse health effects, and is generally safe for use and contact by humans.

"Fast drying" shall mean that in less than 1 second, ink-jet inks printed on typical POS papers will be dry to the touch, though less than one half second is preferred, and less than 300 msec is most preferred.

"Decap performance" refers to the tendency of inks, when present in an ink-jet pen, to crust near the jetting orifice due to the evaporation of solvents present in the ink. Ink-jet inks that exhibit good long-term decap performance do not require the use of a capping mechanism designed to prevent this type of crusting (as is the case with most ink-jet inks) over reasonable periods of time, e.g., several weeks or more.

Ink-jet ink compositions are disclosed herein that are reliable, environmentally friendly, and are generally fast drying on the order of 300 msec and less. Further, the ink composition exhibits minimal puddling leading to improved print quality. With this in mind, the ink-jet inks described herein comprise several components. First, from about 1% to 90% by weight of a first humectant must be present which is selected from the group consisting of glycerol, propanediol, and combinations thereof. These can exist in amounts of up to 90% because they are considered to be totally non-toxic ingredients. Second, from 1% to 25% by weight of a second humectant can also be present which is selected from the group consisting of ethylene glycol, diethylene glycol, propylene glycol, and combinations thereof. The reason these are limited to 25% is because these substances are regulated by European Union as hazardous above this amount. Next, from 1% to 20% by weight of a drying agent selected from the group consisting of 1,2-hexanediol, 1,2-pentanediol, and combinations thereof can be used to facilitate fast drying properties. These ingredients can be added when the desire is to provide a very fast drying ink for applications such as point-of-sale (POS) devices. From 0% to 20% by weight of 2-pyrrolidone can also added. Again, the reason this amount is limited to 20% is to comply with the EU regulations related to toxicity of products. The colorant is provided in the ink-jet ink by at least two dyes. One of the two dyes must be a waterfastness control dye, such as an azo-containing dye or a phthalocyanine-containing dye. Thus, from about 0.05% to 10.0% by weight of a waterfastness control dye must be present. The second dye or additional dye can be any dye functional for providing a desired color. The second dye can be present at from about 1.0% to 10.0% by weight.

In one embodiment, the first humectant, the second humectant, and the 2-pyrrolidone can be present in combination such that a total weight percentage of these three components is from 30% to 90% by weight. In a more preferred embodiment, the total weight percentage of these three components can be from 40% to 60% by weight. In an even more preferred embodiment, the total weight percentage of these three components can be from 45% to 58% by weight. In yet another embodiment, when the total weight percentage of these three components, i.e., first humectant, second humectant, and 2-pyrrolidone, is greater than about 30%, only one dye of any functional type is required to be present.

Appropriate azo-containing control dyes that can be used include Direct Red 227, Direct Red 254, Direct Yellow 86, carboxylated Food Black 286, carboxylated Food Black 287, and Acid Orange 7. Additionally, any other combination of functional azo-containing dyes can also be used. Alternatively, the waterfastness control dye can be a phthalocyanine-containing dye, such as nickel phthalocyanine, aluminum phthalocyanine, and/or copper phthalocyanine.

As stated, the second dye can be any dye that is functional for providing a desired color. Thus, even azo-containing dyes and phthalocyanine-containing dyes can be used for the second colorant as well. More generally, the second dyes can include any water- or organic-soluble black, red, blue, green, orange, pink, yellow, or other color. Examples include, but are not limited to, (1) blacks including Food Black 2, Carta Black; Direct Black 168, carboxylated Food Black 286, carboxylated Food Black 287; (2) reds including Direct Red 9, and Acid Red 52; (3) yellows including Acid Yellow 23, Food Yellow 3; (4) blues including Acid Blue 9, Acid Blue 185, Direct Blue 86, and FD&C Blue 1, to name a few. All of the dyes mentioned are anionic dyes, and are typically supplied with sodium counterions. However, the sodium counterions can be replaced with lithium, potassium, ammonium, tetramethyl amine (tetramethyl ammonium), triethanol amine (triethanol ammonium), or diethylene amine cations, as disclosed, for example, in U.S. Pat. Nos. 4,685,968; 4,761,180; 4,786,327; and 4,810,292. The counterion replacement may be performed by reverse osmosis, such as disclosed and claimed in U.S. Pat. No. 4,685,968, or by ion exchange, such as disclosed and claimed in U.S. Pat. No. 4,786,327.

To illustrate some embodiments of the present invention, several green, blue, magenta, orange, black, and red ink-jet inks can be formulated by using from 0.1% to 1.0% by weight of Direct Red 227 (DR227) as the waterfastness control dye. This is particularly unique with respect to green and blue inks because red dyes are typically not used in green and blue ink-jet ink formulations. For example, a green ink-jet ink can be prepared by adding from 1.5% to 3.5% of Acid Blue 9 by weight and about 1.0% to 3.0% of Direct Yellow 86 by weight to the Direct Red 227 dye described above. Additionally, a blue ink-jet ink can be prepared by adding about 1.0% to 3.0% of Acid Blue 9 by weight and about 0.5% to 2.0% of Acid Red 52 by weight to the Direct Red 227 dye. Next, a black ink-jet ink can be prepared by adding about 3.0% to 5.0% of Food Black 2 by weight to the Direct Red 227 dye. Additionally, a red ink-jet ink can be prepared by adding about 0.5% to 2.5% of Acid Red 52 by weight and about 1.0% to 3.0% of Direct yellow 86 by weight to the Direct Red 227 dye.

In alternative embodiments, where different waterfastness control dyes are used, an orange ink-jet ink can be formulated with from 0.1% to 1% of Acid Orange 7 (the azo-containing waterfastness control dye) by weight with about 0.5% to 2.5% of Acid Red 87 by weight and about 1.0% to 3.0% of Direct Yellow 86 by weight. Additionally, a magenta ink-jet ink can be formulated with from 0.1% to 1% of Direct Red 254 (the azo-containing waterfastness control dye) by weight with about 0.5% to 2.5% of Acid Red 52 by weight.

A drying agent can also be present in the ink-jet formulations described herein. Specifically, 1,2-hexanediol and/or 1,2-pentanediol can be added as a drying agent. Such an additive can be more effective than simply adding increased amounts of surfactants. While it is known that surfactants can decrease dry time of inks, surfactants can also enhance the toxicity of some of the other chemical components and exacerbate puddling of the ink. Specifically, by adding 1,2-hexanediol and/or 1,2-pentanediol in appropriate amounts, good dry time of less than about 300 msec and low puddling can be realized. Additionally, these drying agents can promote good frequency response in the area of about 3 kHz. Though the use of a drying agent as described above is preferred over the use of surfactants, surfactants can still be used in low amounts to maintain low toxicity. If a surfactant is used to improve dry time, then non-limiting examples of preferred surfactants such as those available under the trade names TERGITOL™, SILWET™, DOWFAX™, DOWANOL™, AND SURFYNOL™ are appropriate. However, as stated, these should only be added in low, non-toxic, and non-puddling amounts.

In addition to the humectants, the drying agents, the 2-pyrrolidone, the surfactants, and the dyes describe herein, additives selected from the group consisting of buffers, corrosion inhibitors, biocides, polymers, puddling control agents, pigments, binders, and combinations thereof, can be added to achieve desired results. If such additives are added, from about 0.01% to 3% of each by weight can preferably be used, though any effective amount by weight can be added. However, it is important to note that the ink-jet ink formulations described herein have been formulated to provide non-toxic and environmentally friendly inks.

The ink-jet ink compositions described herein have several advantages over many of the inks of the prior art.

Because these inks can be considered to be environmentally friendly, there is no health hazard issue with respect to their use in any application. Additionally, there is little or no waste disposal concern associated with the ink-jet inks described herein. Though these inks were formulated primarily with environmental considerations in mind, other desirable properties have been realized. For example, the inks have long term decap providing an ideal ink for applications where there is no capping. Additionally, essentially little or no kogation occurs with the inks of the present invention. Kogation is a term describing the formation of a non-soluble crystal residue that coats the inside of a firing chamber. These crystals are typically formed upon the heating of the ink during the firing process. The fact that the ink-jet inks of the present invention are not subject to substantial kogation, the print heads used with the inks of the present invention will typically not wear out as quickly. Other advantages of the inks described herein include their compatibility with thermal mechanical pulp (TMP) paper. This is significant because TMP paper is widely used in the POS receipt media market, but provides a difficult substrate to obtain good waterfastness with typical inkjet inks. By using this type of paper with the environmentally friendly inks of the present invention, the print job can still be legible after soaking the printed paper in water. Additionally, due to the nature of ink-jet printing, multiple color POS print jobs can be provided in a simple and easy manner. Thus, in comparison to dot-matrix prints and direct thermal prints, a significant advantage can be realized.

In a further detailed aspect of the present invention, an environmentally friendly ink-jet ink composition for point-of-sale applications is disclosed having a dye load comprising from 0.05% to 1.0% by weight of a waterfastness control dye selected from the group consisting of azo-containing dyes and phthalocyanine-containing dyes; and at least one additional dye present at from about 1.0% to 10.0% by weight, with the proviso that the total dye load be at least 2% by weight, and wherein the ink-jet ink is substantially non-toxic. Surprisingly, even if this ink-jet ink is printed on thermal mechanical pulp (TMP) paper, or other known POS papers, then a typical drytime can be less than 300 msec.

In yet another detailed aspect of the invention, a point-of-sale printing system is disclosed, comprising a non-toxic ink-jet ink; a point-of-sale (POS) paper configured for accepting printed ink-jet ink; and an ink-jet pen configured for rapid frequency printing of the ink-jet ink onto the paper, wherein the ink-jet ink printed on the paper has a drytime of less than 300 msec, and wherein the ink-jet ink exhibits good decap performance.

Though not required, the ink-jet inks described previously can be used, such as, for example, ink-jet ink having effective amounts of a waterfastness control dye and a second dye. Additionally, a suitable POS paper that can be used is thermal mechanical pulp (TMP) paper or tablet bond paper.

EXAMPLES

The following examples illustrate various formulations for preparing the ink-jet ink compositions of the present invention. The following examples should not be considered as limitations of the invention, but should merely teach how to make the best known ink formulations based upon current experimental data.

Example 1

A green ink-jet ink composition was prepared by admixing the following ingredients by weight: 5% 1,3- propanediol, 24% ethylene glycol, 15% 2-pyrrolidone, 9% 1,2-hexanediol, 2% Acid Blue 9 sodium salt, 2.5% Acid Yellow 23 sodium salt, 0.5% Direct Red 227 sodium salt, 0.3% MOPS, and the balance in water. The ink is printed onto thermal mechanical pulp receipt paper and immersed in water for 24 hours. At the end of 24 hours, the printed characters are still legible.

Example 2

A blue ink-jet ink composition was prepared by admixing the following ingredients by weight: 11% glycerol, 20% diethylene glycol, 18% 2-pyrrolidone, 5% 1,2-hexanediol, 2% Acid Blue 9 sodium salt, 1% Acid Red 52 sodium salt, 0.4% Direct Red 227 sodium salt, 0.3% MOPS, and the balance in water. The ink is printed onto thermal mechanical pulp receipt paper and immersed in water for 24 hours. At the end of 24 hours, the printed characters are still legible.

Example 3

A magenta ink-jet ink composition was prepared by admixing the following ingredients by weight: 10% glycerol, 20% ethylene glycol, 15% 2-pyrrolidone, 5% 1,2-hexanediol, 2% Acid Red 52 sodium salt, 0.5% Direct Red 254 sodium salt, 0.3% MOPS, and the balance in water.

Example 4

An orange ink-jet ink composition was prepared by admixing the following ingredients by weight: 10% glycerol, 15% ethylene glycol, 20% 2-pyrrolidone, 5% 1,2-hexanediol, 2% Food Yellow 3 sodium salt, 1% Direct Yellow 86 sodium salt, 0.5% Acid Orange 7 sodium salt, 0.3% MOPS, and the balance in water. The ink is printed onto thermal mechanical pulp receipt paper and immersed in water for 24 hours. At the end of 24 hours, the printed characters are still legible.

Example 5

A black ink-jet ink composition was prepared by admixing the following ingredients by weight: 15% glycerol, 25% ethylene glycol, 10% 2-pyrrolidone, 7% 1,2-hexanediol, 0.7% Direct Red 227 sodium salt, 4.5% Food Black 2 triethanolamine (TEA) salt, 0.3% MOPS, and the balance in water. The ink is printed onto thermal mechanical pulp receipt paper and immersed in water for 24 hours. At the end of 24 hours, the printed characters are still legible.

Example 6

A red ink-jet ink composition was prepared by admixing the following ingredients by weight: 5% glycerol, 20% ethylene glycol, 20% 2-pyrrolidone, 8% 1,2-hexanediol, 0.5% Direct Red 227 sodium salt, 1.5% Acid Red 52 sodium salt, 2% Direct Yellow 86 sodium salt, 0.3% MOPS, and the balance in water. The ink is printed onto thermal mechanical pulp receipt paper and immersed in water for 24 hours. At the end of 24 hours, the printed characters are still legible.

Example 7

The ink-jet ink compositions described in Examples 1 to 6 above were loaded into the reservoir of a print cartridge having a nickel orifice plate. The print cartridge was placed in a point-of-sale (POS) ink-jet printer operating at a frequency of 3 kHz. The print medium was thermal mechanical pulp receipt paper.

The pen was loaded to ink-out approximately 5 million 9-point font characters. After printing a significant number of characters, minimal ink puddling was present on the orifice plate, and no ink puddle reached the pen electrical interconnect below the nozzle plate. The resulting dry time was measured by mounting a small horsehair brush 1.0 inches behind the pen such that the brush was in contact with the printed medium. The pen was then printed with a carriage speed of 5 inches per second. Table 1 below sets forth the dry times for each ink tested.

TABLE 1

| Ink used (Example No.; Color) | Dry time (msec) |
| --- | --- |
| 1; Green | <100 |
| 2; Blue | 250 |
| 3; Magenta | 200 |
| 4; Orange | 200 |
| 5; Black | 200 |
| 6; Red | 100 |

Table 1 above shows that each of the ink-jet inks formulated in accordance with the present disclosure had dry times at a fraction of a second. In fact, each color had a dry time of less than 250 msec, which was better than the intended goal of less than 300 msec of dry time.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

We claim:

1. A waterfast, environmentally friendly ink-jet ink, comprising:
   (a) from 1% to 90% by weight of a first humectant selected from the group consisting of glycerol, propanediol, and combinations thereof;
   (b) from 1% to 25% by weight of a second humectant selected from the group consisting of ethylene glycol, diethylene glycol, propylene glycol, and combinations thereof;
   (c) from 1% to 20% by weight of a drying agent selected from the group consisting of 1,2-hexanediol, 1,2-pentanediol, and combinations thereof;
   (d) from 0% to 20% by weight of 2-pyrrolidone;
   (e) from 0.05% to 10.0% by weight of a waterfastness control dye selected from the group consisting of azo-containing dyes and phthalocyanine-containing dyes; and
   (f) at least one additional dye present at from about 1.0% to 10.0% by weight.

2. An ink-jet ink as in claim 1 wherein the waterfastness control dye is an azo-containing dye.

3. An ink-jet ink as in claim 2 wherein the azo-containing dye is selected from the group consisting of Direct Red 227, Direct Red 254, Direct Yellow 86, Acid Orange 7, and combinations thereof.

4. An ink-jet ink as in claim 3 wherein the waterfastness control dye is Direct Red 227 and is present at from 0.1% to 1.0% by weight.

5. An ink-jet ink as in claim 3 wherein the waterfastness control dye is Direct Red 254 and is present at from 0.1% to 1.0% by weight.

6. An ink-jet ink as in claim 3 wherein the waterfastness control dye is Acid Orange 7 and is present at from 0.1% to 1.0% by weight.

7. An ink-jet ink as in claim 3 wherein the waterfastness control dye is Direct Yellow 86 and is present at from 0.1% to 1.0% by weight.

8. An ink-jet ink as in claim 1 wherein the waterfastness control dye is a phthalocyanine-containing dye.

9. An ink-jet ink as in claim 8 wherein the phthalocyanine-containing dye is selected from the group consisting of nickel phthalocyanine, aluminum phthalocyanine, copper phthalocyanine, and combinations thereof.

10. An ink-jet ink as in claim 4 wherein the ink is green and the at least one additional dye comprises about 1.5% to 3.5% of Acid Blue 9 by weight and about 1.0% to 3.0% of Direct Yellow 86 by weight.

11. An ink-jet ink as in claim 4 wherein the ink is blue and the at least one additional dye comprises about 1.0% to 3.0% of Acid Blue 9 by weight and about 0.5% to 2.0% of Acid Red 52 by weight.

12. An ink-jet ink as in claim 5 wherein the ink is magenta and the at least one additional dye comprises about 0.5% to 2.5% of Acid Red 52 by weight.

13. An ink-jet ink as in claim 6 wherein the ink is orange and the at least one additional dye comprises about 0.5% to 2.5% of Acid Red 87 by weight and about 1.0% to 3.0% of Direct Yellow 86 by weight.

14. An ink-jet ink as in claim 4 wherein the ink is red and the at least one additional dye comprises about 0.5% to 2.5% of Acid Red 52 by weight and about 1.0% to 3.0% of Direct Yellow 86 by weight.

15. An ink-jet ink as in claim 1 further comprising at least one additive selected from the group consisting of buffers, corrosion inhibitors, surfactants, biocides, polymers, puddling control agents, pigments, and binders, and combinations thereof, and wherein said additive present is present at from about 0.01% to 3% by weight.

16. An environmentally friendly ink-jet ink composition for point-of-sale applications having a dye load, comprising:
(a) from 0.05% to 1.0% by weight of a waterfastness control dye selected from the group consisting of azo-containing dyes and phthalocyanine-containing dyes; and
(b) at least one additional dye present at from about 1.0% to 10.0% by weight,
with the proviso that the total dye load be at least 2% by weight, and wherein the ink-jet ink is substantially non-toxic.

17. An ink-jet ink composition as in claim 16 printed on thermal mechanical pulp (TMP) paper, and wherein the drytime when printed on the thermal mechanical pulp paper is less than 300 msec.

18. A waterfast, environmentally friendly ink-jet ink, comprising:

(a) from 1% to 90% by weight of a first humectant selected from the group consisting of glycerol, propanediol, and combinations thereof;
(b) from 1% to 25% by weight of a second humectant selected from the group consisting of ethylene glycol, diethylene glycol, propylene glycol, and combinations thereof;
(c) from 1% to 20% by weight of a drying agent selected from the group consisting of 1,2-hexanediol, 1,2-pentanediol, and combinations thereof;
(d) from 0% to 20% by weight of 2-pyrrolidone;
(e) from 0.05% to 10.0% by weight of a waterfastness control dye selected from the group consisting of azo-containing dyes and phthalocyanine-containing dyes; and
(f) at least one additional dye present at from about 1.0% to 10.0% by weight,
with the proviso that the first humectant, the second humectant, and 2-pyrrolidone are present in combination at from 30% to 90% by weight.

19. An ink-jet ink as in claim 18 wherein the first humectant, the second humectant, and 2-pyrrolidone are present at from 40% to 60% by weight.

20. An ink-jet ink as in claim 18 wherein the first humectant, the second humectant, and 2-pyrrolidone are present at from 45% to 58% by weight.

21. A waterfast, environmentally friendly ink-jet ink, comprising:
(a) from 1% to 90% by weight of a first humectant selected from the group consisting of glycerol, propanediol, and combinations thereof;
(b) from 1% to 25% by weight of a second humectant selected from the group consisting of ethylene glycol, diethylene glycol, propylene glycol, and combinations thereof;
(c) from 1% to 20% by weight of a drying agent selected from the group consisting of 1,2-hexanediol, 1,2-pentanediol, and combinations thereof;
(d) from 0% to 20% by weight of 2-pyrrolidone; and
(e) from 1.0% to 10.0% by weight of a dye,
with the proviso that the first humectant, the second humectant, and 2-pyrrolidone are present in combination at from 30% to 90% by weight.

22. An ink-jet ink as in claim 21 wherein the first humectant, the second humectant, and 2-pyrrolidone are present at from 40% to 60% by weight.

23. An ink-jet ink as in claim 21 wherein the first humectant, the second humectant, and 2-pyrrolidone are present at from 45% to 58% by weight.

* * * * *